(12) United States Patent
Zhang et al.

(10) Patent No.: US 12,138,697 B2
(45) Date of Patent: Nov. 12, 2024

(54) RECIPROCATING SAW

(71) Applicant: Nanjing Chervon Industry Co., Ltd., Nanjing (CN)

(72) Inventors: Wei Zhang, Nanjing (CN); Zhongquan Xu, Nanjing (CN); Rui Zhang, Nanjing (CN); Yang Zhou, Nanjing (CN); Suixi Ding, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 295 days.

(21) Appl. No.: 17/500,068

(22) Filed: Oct. 13, 2021

(65) Prior Publication Data
US 2022/0118534 A1  Apr. 21, 2022

(30) Foreign Application Priority Data

Oct. 16, 2020 (CN) .......................... 202011107686.6
Sep. 30, 2021 (CN) .......................... 202111160407.7

(51) Int. Cl.
*B23D 49/16* (2006.01)
*B23D 51/16* (2006.01)

(52) U.S. Cl.
CPC .......... *B23D 49/16* (2013.01); *B23D 49/165* (2013.01); *B23D 51/16* (2013.01)

(58) Field of Classification Search
CPC .... B23D 49/16; B23D 49/162; B23D 49/165; B23D 49/167; B23D 49/10; B23D 51/16; B23D 51/00; B23D 51/20; B23D 29/16; B23D 29/162; B23D 29/165; B23D 29/167; B25F 5/006
See application file for complete search history.

(56) References Cited

U.S. PATENT DOCUMENTS

| | | | |
|---|---|---|---|
| 6,249,979 B1 * | 6/2001 | Bednar | B23D 49/165 30/182 |
| 6,357,124 B1 * | 3/2002 | Wall | B23D 51/10 30/376 |
| 7,526,868 B2 * | 5/2009 | Oki | B23D 49/162 30/392 |
| 7,743,514 B2 * | 6/2010 | Oki | B23D 49/162 30/392 |
| 10,413,980 B2 * | 9/2019 | Naughton | B23D 51/16 |

(Continued)

FOREIGN PATENT DOCUMENTS

| | | | | |
|---|---|---|---|---|
| CN | 115338474 A | * | 11/2022 | ........ B23D 49/167 |
| WO | WO-2020137358 A1 | * | 7/2020 | ........ B23D 49/16 |

OTHER PUBLICATIONS

CN-115338474-A English Translation; Nov. 2022 Mlaw Y; B23D49/167.*

(Continued)

*Primary Examiner* — Laura M Lee
(74) *Attorney, Agent, or Firm* — Greenberg Traurig, LLP

(57) ABSTRACT

A reciprocating saw includes a housing; a functional assembly including a motor supported by the housing; a sliding rod for connecting and driving the saw blade; a transmission mechanism connecting the motor and the sliding rod for driving the sliding rod to reciprocate. The reciprocating saw further includes a connecting device configured to rotatably connect the functional assembly to the housing and a buffer arranged between the functional component and the housing.

17 Claims, 18 Drawing Sheets

(56) References Cited

U.S. PATENT DOCUMENTS

| | | | | |
|---|---|---|---|---|
| 11,396,055 B2* | 7/2022 | Naoi | .................. | B23D 59/04 |
| 11,529,729 B2* | 12/2022 | Ogura | ................ | H02K 11/0094 |
| 2020/0282482 A1* | 9/2020 | Naoi | .................. | B23D 49/162 |
| 2022/0305577 A1* | 9/2022 | Yamashita | ............. | B23D 49/16 |

OTHER PUBLICATIONS

WO-2020137358-A1 English Translation; Jul. 2020; Inui K; B23D49/16.*

* cited by examiner

RECIPROCATING SAW

RELATED APPLICATION INFORMATION

This application claims the benefit under 35 U.S.C. § 119(a) of Chinese Patent Application No. CN 202011107686.6, filed on Oct. 16, 2020, and Chinese Patent Application No. CN 202111160407.7, filed on Sep. 30, 2021, which applications are incorporated by reference in their entirety herein.

BACKGROUND

A reciprocating saw performs a cutting work by driving a saw blade to reciprocate. Vibration has always been a difficult problem to be solved for reciprocating saws. Failure to effectively reduce the vibration of the reciprocating saws will show negative influence on users' operating experience. It is hard to reduce the vibration of the reciprocating saws while trying to improve their cutting efficiency. The traditional vibration isolation methods of the reciprocating saws may lead to poor manipulation performance or be unable to effectively reduce the vibration. Also, it is hard to avoid increasing the size of the reciprocating saws by traditional efficiency improving means, which makes the feature of compactness difficult to achieve.

SUMMARY

In one aspect of a disclosure, a reciprocating saw includes a housing; a functional assembly, including: a motor supported by the housing; a sliding rod for connecting and driving the saw blade; a transmission mechanism which connects the motor and the sliding rod, and drives the sliding rod to reciprocate motion; The reciprocating saw further includes a connecting device rotatably connect the functional assembly to the housing, and a buffer arranged between the functional component and the housing.

In one example, the functional assembly is rotatable about a first straight line relative to the housing; the reciprocating saw has a cutting plane, and the first straight line is perpendicular to the cutting plane.

In one example, the transmission mechanism includes: a transmission gear driven to rotate by a motor; a counterweight coupled to the transmission gear; a first eccentric structure connecting the sliding rod and the transmission gear. The transmission gear can drive the sliding rod to reciprocate along the first eccentric structure in a first direction and a second direction. The counterweight moves in the second direction opposite to the first direction as the sliding rod moves in the first direction, In one example, the buffer can be elastically deformed at least in the direction of a second straight line perpendicular to the first straight line during the operation of the reciprocating saw.

In one example, the functional assembly further includes a gear box to support the transmission mechanism, and the buffer is arranged between the gear box and the housing.

In one example, the counterweight is eccentrically arranged on the transmission gear and rotates synchronously with the transmission gear.

In one example, the transmission assembly further includes a second eccentric structure coupled to the counterweight. As the sliding rod moves in the first direction, the second eccentric structure drives the counterweight to move in the second direction opposite to the first direction.

In one example, the motor includes a motor shaft that rotates about the first axis. The first axis is perpendicular to the first straight line and the first direction, and the axial distance between the counterweight and the sliding rod along the first axis is greater than 10 mm.

In one example, the buffer is one of or a combination of sponge, rubber or spring, and the buffer has a first buffer surface in contact with the housing and a second buffer surface in contact with the functional component.

In one example, the connecting device includes a fixed member and a rotating member. The rotating member is configured to rotatably connected with the fixed member, and the fixed member and the rotating member are fixedly connected with the gear box and the housing, respectively.

In one example, as the sliding rod moves in the second direction, the sliding rod slides towards the housing, and the front end of the sliding rod moves downward.

Through the cooperation of the connecting device and the buffer, as well as the positioning of the connecting device, the vibration generated by the reciprocating saw in the transmission process is able to be utilized to accomplish the orbital function which contributes to improve the cutting efficiency of the reciprocating saw. In addition, the buffer reduces the vibration of the housing, extends the service life of the reciprocating saw, and enhances the user's operation experience.

DETAILED DESCRIPTION

Figure 1:
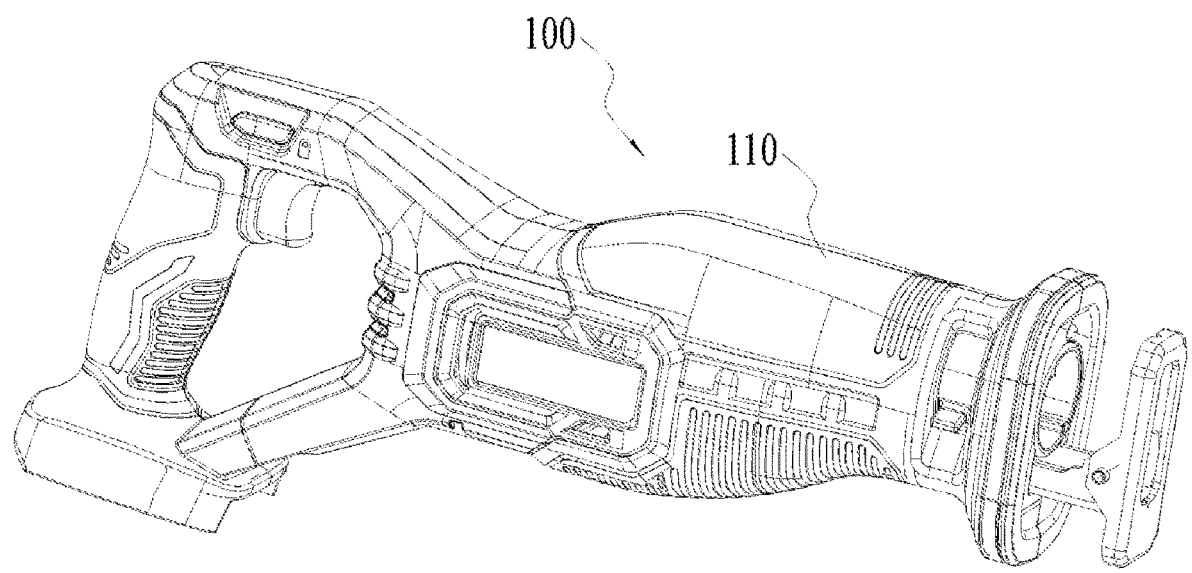
FIG. 1 is a perspective view of a reciprocating saw as the first example.
Figure 2:
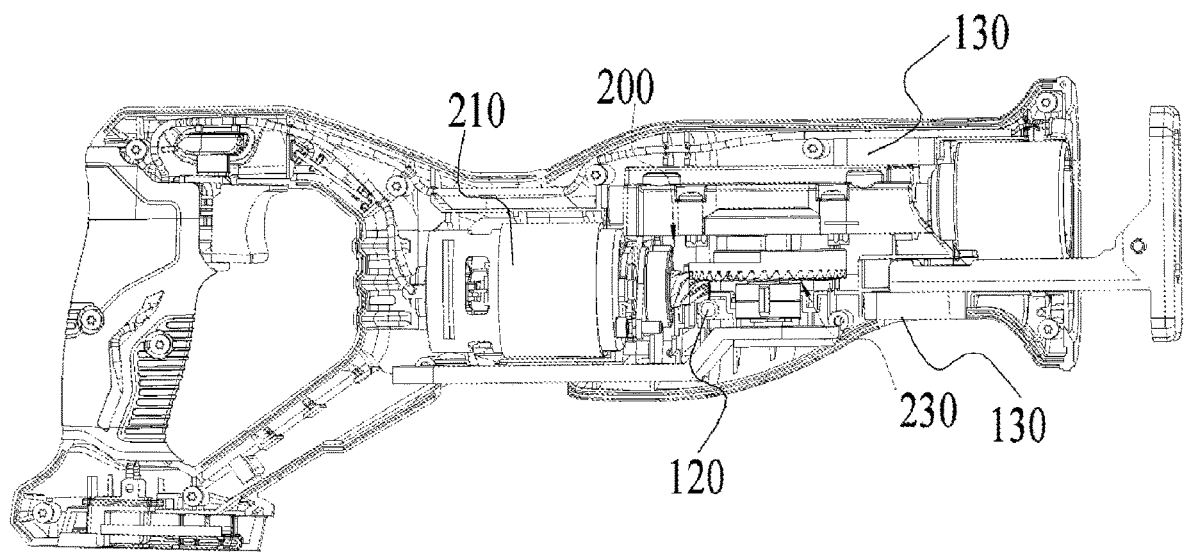
FIG. 2 is a schematic view of the reciprocating saw in FIG. 1.
Figure 3:
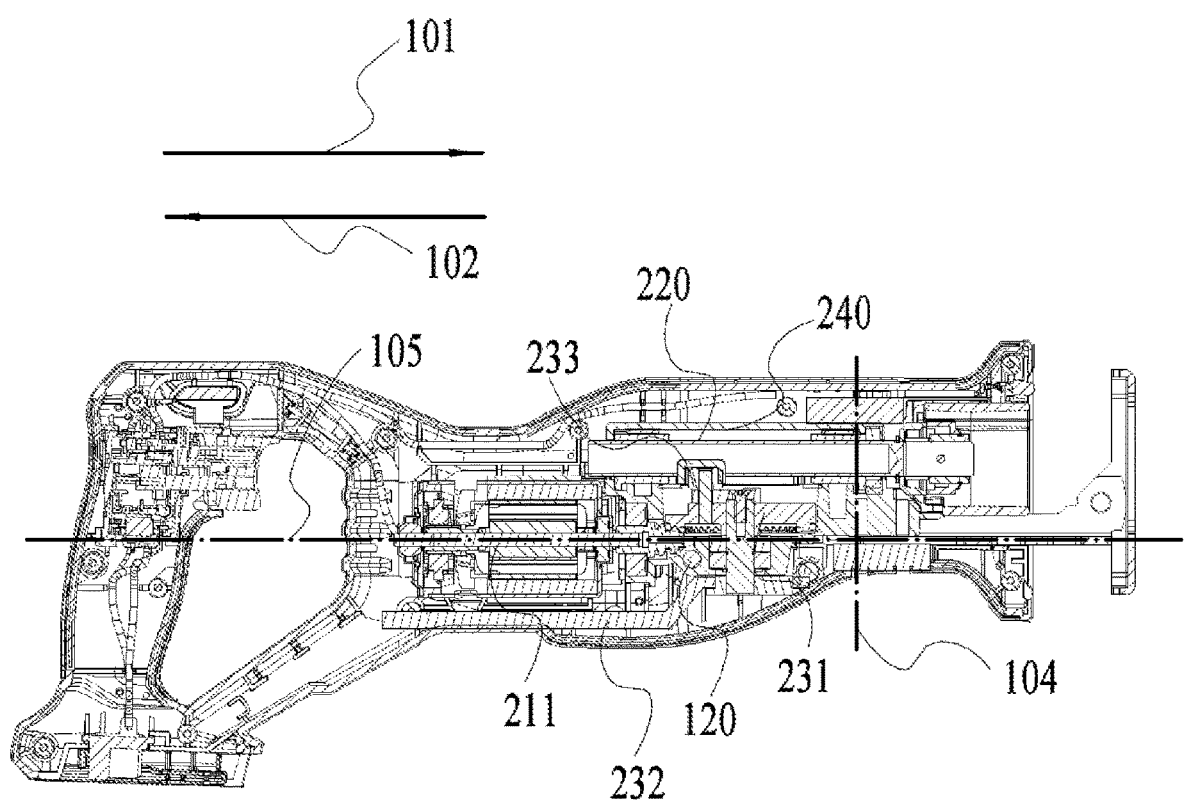
FIG. 3 is a section view of the reciprocating saw in FIG. 1.

The present disclosure provides a reciprocating saw 100 for cutting tools. Referring to FIGS. 1 to 3, an example of the present disclosure provides a reciprocating saw 100, which includes a housing 110 and a functional assembly 200. The functional assembly 200 implements a cutting function of the reciprocating saw 100. The functional assembly 200 includes a motor 210, a sliding rod 220, and a transmission mechanism 230. The sliding rod 220 is configured to connect and drive a saw blade to reciprocate. The motor 210 is supported by the housing 110, and there is a gap or an elastic element between the motor 210 and the housing 110. The transmission mechanism 230 connects the motor 210 and the sliding rod 220 and drives the sliding rod 220 to reciprocate. The reciprocating saw 100 further includes a connecting device 120 and a buffer 130. The connecting device 120 is configured to rotatably connect the functional assembly 200 to the housing 110, and the connecting device 120 is rotatable about a central axis extending along a first straight line 103. The buffer 130 is positioned between the functional assembly 200 and the housing 110. While the reciprocating saw 100 is in operation, the motor 210 drives the sliding rod 220 to reciprocate along a first direction 101 and a second direction 102 through the transmission mechanism 230. The transmission mechanism 230 generates vibration when transmitting the power from the motor 210, so that the functional assembly 200 rotates about the first straight line 103 relative to the housing 110, so that the saw blade is driven to swing accordingly and the cutting efficiency of the saw blade is improved. The buffer 130 positioned between the assembly 200 and the housing 110 buffers the functional assembly 200, thereby reducing the impact force between the functional assembly 200 and the housing 110 and reducing the vibration of the housing 110.

Figure 5:
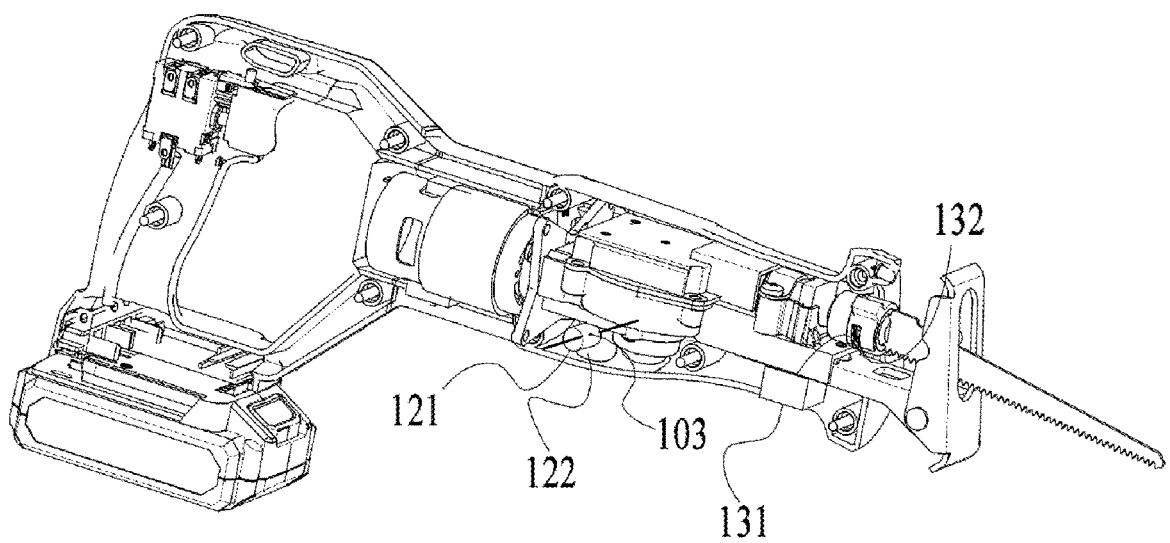
FIG. 5 is a schematic view of the inner structure of a reciprocating saw as the first example.

According to FIGS. 3 and 5, the connecting device 120 includes a rotating member 121 and a fixed member 122. The fixed member 122 is fixedly coupled to the functional assembly 200, and the rotating member 121 is fixedly coupled to the housing 110. The fixed member 122 is provided with a pin hole, so that the functional assembly 200 can rotate about the first straight line 103 relative to the housing 110. Optionally, the fixed member is fixedly coupled to the housing, and the rotating member is fixedly coupled to the functional assembly.

Optionally, the fixed member 122 and the rotating member 121 are fixedly coupled with each other in the first straight line 103. That is, there is no relative displacement between the fixed member 122 and the rotating member 121. The reciprocating saw 100 has a cutting plane 106. The saw blade extends in the cutting plane 106 when the saw blade installed on the front end of the sliding rod 220. The first straight line 103 is perpendicular to the cutting plane 106, and the movement of the functional assembly 200 on the cutting plane 106 is limited. When the reciprocating saw 100 is in operation, the transmission mechanism 230 drives the sliding rod 220 to rotate about the first straight line 103 in a plane parallel to the cutting plane 106. The sliding rod 220 drives the saw blade to implement the reciprocating motion along the first direction and the second direction parallel to the cutting plane 106.

Optionally, the buffer 130 is positioned between the fixed member 122 and the rotating member 121 in the first straight line 103. The buffer 130 is an elastic element.

Figure 4:
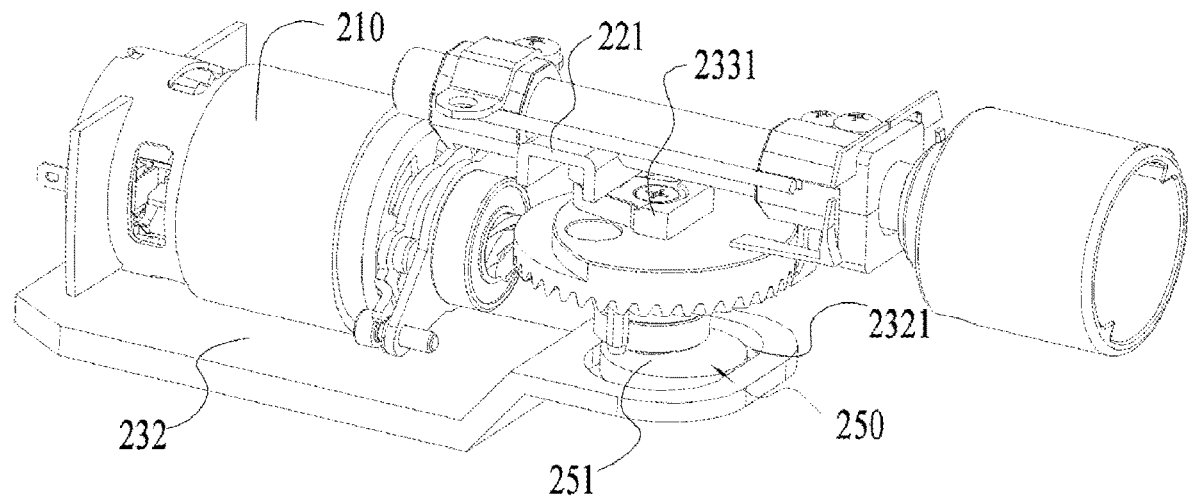
FIG. 4 is a schematic view of the functional assembly structure of the reciprocating saw in FIG. 1.

According to FIGS. 3 and 4, the transmission mechanism 230 includes a transmission gear 231, a counterweight 232 and a first eccentric structure 233. The motor 210 has a motor shaft 211 along a first axis 105. The transmission gear 231 is engaged with the motor shaft 211 so as to be driven to rotate by the motor 210. The counterweight 232 is coupled to the transmission gear 231. The first eccentric structure 233 connects the sliding rod 220 and the transmission gear 231. The transmission gear 231 can drive the sliding rod 220 to reciprocate along the first direction 101 and the second direction 102 through the first eccentric structure 233. The counterweight 232 moves in the second direction 102 opposite to the first direction 101 when the sliding rod 220 slides in the first direction 101.

The reciprocating saw 100 further includes a sleeve for supporting and positioning the sliding rod 220. The sliding rod 220 is positioned through the sleeve and is restricted by the sleeve to extend along the first direction 101, so that the sliding rod 220 is driven by the transmission mechanism 230 to reciprocate along the first direction 101 and the second direction 102.

The functional assembly 200 further includes a gear box 240 for supporting the transmission mechanism 230. Portion of the transmission mechanism 230, as well as the sleeve, is placed inside the gear box 240. The fixed member and the rotating member are fixedly coupled with the gear box and the housing respectively. Portion of the transmission mechanism 230 is fixedly coupled to the gear box 240 so that the entire transmission mechanism 230 rotates with the gear box 240 synchronously. The buffer 130 is positioned between the gear box 240 and the housing 110.

Figure 9:
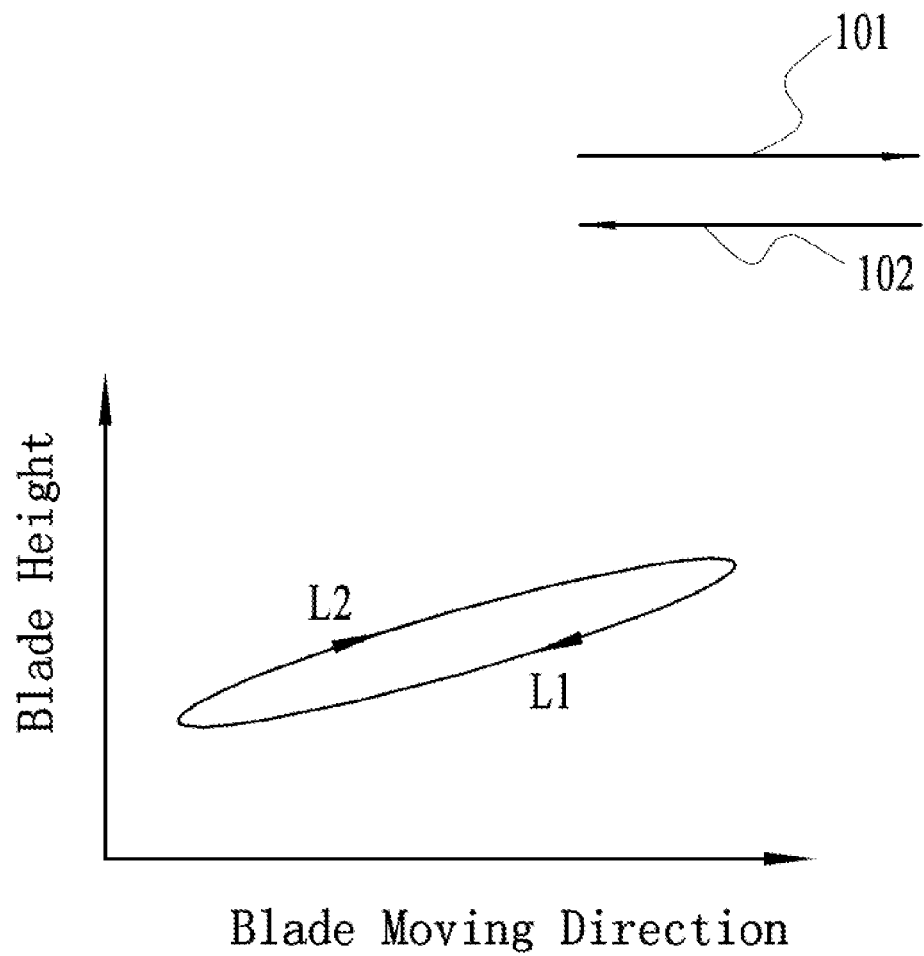
FIG. 9 is a schematic diagram depicting the path of the front end of the sliding rod during operation in accordance with the present disclosure of the reciprocating saw.

As shown in FIG. 9, L2 is a path for the front end of the sliding rod 220 in its return stroke when the sliding rod 220 is driven by the transmission mechanism 230 to reciprocate. On this situation, the sliding rod 220 moves in the first direction 101, and the counterweight 232 moves in the second direction 102 opposite to the first direction 101. Meanwhile, the transmission gear 231 imparts a pull force to the sliding bar 220 in the second direction 102, and a pull force to the counterweight 232 in the first direction 101. Due to the reaction of force, the transmission gear 231 generates a torque which lifts the entire front end of the transmission mechanism 230 upward. The saw blade is therefore lifted upward by the sliding rod 220. In this way, the saw blade is away from the workpiece when it is at a extend-out position. This helps to reduce the resistance of the saw blade and improves the cutting efficiency. L1 is a path for the front end of the sliding rod during the cutting process. On this situation, the sliding rod 220 moves in the second direction 102, and the counterweight 232 moves in the first direction 101. Meanwhile, the entire front end of the transmission mechanism 230 is pressed downward due to the torque generated by the transmission gear 231. The cutting force acting on the workpiece is increased and the cutting efficiency is improved. There are a plurality of the buffers 130 positioned between the housing 110 and the gear box 240.

When the reciprocating saw 100 is in operation, the torque generated by the transmission mechanism 230 drives the gear box 240 to rotate relative to the housing 110. The configuration of the buffers 130 allows the gear box 240, the transmission mechanism 230, and the sliding rod 220 to rotate all together relative to the housing 110, and damps the gear box 240, so as to reduce the vibration of the housing 110 and further improve users' using experience.

Optionally, the connecting device is configured to connect the gear box and the housing, so that the gear box and the housing are rotationally connected. The connecting device configured to be tapered placed on both sides of the gear box, and one or more recesses posit the connecting device inside the housing. In this way, the gear box is rotatable about the first straight line relative to the housing.

Optionally, the motor 210 supported by the gear box 240 is rotatable together with the gear box 240, the motor 210, and the sliding rod 220 relative to the housing 110 when the reciprocating saw 100 is in operation. Optionally, when the motor 210 is an inner rotor motor 210, the buffer 130 can be directly arranged between the motor 210 and the housing 110, and there is buffer 130 between the gear box 240 and the housing 110.

In one example, the reciprocating saw further includes a motor housing arranged outside the motor. The motor housing and the motor are synchronously rotatable relative to the housing. The vibration of the motor is isolated by the buffer positioned between the motor housing and the housing.

The first eccentric structure 233 includes a transmission member 2331. The transmission member 2331 is positioned on one side of the transmission gear 231 and is eccentrically connected to the transmission gear 231. A guiding rail 221 is perpendicular to the first direction 101 and is provided on one side of the sliding rod 220. In this way, when the reciprocating saw 100 is in operation, the rotating transmission member 2331 is moving in the guiding rail 221 along the direction perpendicular to the first direction 101, so as to drive the guiding rail 221 and the sliding rod 220 to move in the first direction 101 and the second direction 102 with reciprocating movement.

The transmission mechanism 230 further includes a transmission shaft. The transmission shaft driven by the transmission gear 231 is engaged or coupled with the transmission gear 231. The transmission mechanism further includes a second eccentric structure 250. The transmission gear 231 is coupled to the counterweight 232 through the second eccentric structure 250. When the sliding rod 220 moves towards the first direction 101, the second eccentric structure 250 drives the counterweight 232 to move along the second direction 102 opposite to the first direction 101. The second eccentric structure 250 includes a cam 251 configured at one end of the transmission shaft, and the cam 251 is eccentrically connected to the transmission shaft. The counterweight 232 is provided with a guiding hole 2321. The cam 251 rotates in the guiding hole 2321 and drives the counterweight 232 to reciprocate in the first direction 101 and the second direction 102, which will not be described in detail here.

Optionally, the sliding rod 220 is positioned on an upper side of the transmission gear 231, and the counterweight 232 is positioned on a lower side of the transmission gear 231. The axial distance between the counterweight 232 and the sliding rod 220 along the second straight line 104 is greater than 10 mm and less than or equal to 18 mm. The larger the distance between the counterweight 232 and the sliding rod 220 is, the longer the arm of force will be, and the greater the torque will be, so that the cutting efficiency is much increased. However, in order to ensure the compactness of the whole tool, the distance between the counterweight 232 and the sliding rod 220 should not be too long. Optionally, the first axis 105 where the motor shaft 211 of the motor 210 located is parallel to the first direction 101. The projections of the counterweight 232 and the motor 210 to a radial direction of the first direction 101 are partially overlapped.

The second straight line 104 extends in an up and down direction of the reciprocating saw 100. When the reciprocating saw 100 is in operation, the buffer 130 is elastically deformable at least in a direction of the second straight line 104 which is perpendicular to the first straight line 103. The buffer 130 can be positioned above and below the functional unit. The buffer is formed of one of or a combination of sponge, rubber, and spring.

When the reciprocating saw 100 is in operation, the functional assembly 200 rotates around the rotation center, so that a portion of the functional assembly 200 approach upwards to the housing 110, while a portion of the functional components 200 approach downwards to the housing 110. The buffers 130 positioned above and below the functional unit buffer the functional assembly, so that the buffers 130 are compressed in a direction of the second straight line 104 which is perpendicular to the first straight line 103. The buffers also store energy which will be released when the functional unit is on a return stroke. In this way, the reciprocating saw 100 acquires the orbital function and also owns the improved cutting efficiency.

Optionally, the buffers 130 are positioned between the gear box 240 and the housing 110 and are located on the upper and lower side of the gear box 240 as well as the front and rear side of the gear box 240, respectively. The sliding rod 220 slides inside towards the housing while moving in the second direction 102. On this condition, the front end of the sliding rod 220 moves downwards, so that the sliding rod 220 is capable to drive the saw blade to move downwards and drive a rear end of the transmission mechanism 230 to move upwards. The buffers 130 positioned on the upper and lower sides of the gear box 240 buffer the gear box 240. It is noted that the front end of the sliding rod 220 refers to the area close to the position where the saw blade is installed, that is, the saw blade is to be installed to the front end of the sliding rod 220.

Optionally, referring to FIG. 5, the buffer 130 has a first buffer surface 131 in contact with the housing 110 and a second buffer surface 132 in contact with the functional assembly 200. The functional assembly 200 presses the buffer when moving in the direction of the second straight line 104. In another example, the buffer 130 is positioned in contact with the housing 110, and a certain gap is provided between the buffer 130 and the surface of the gear box 240. In one example, the buffer 130 is positioned on the surface of the gear box 240 and is in contact with the surface of the housing 110 and the gear box 240 with gaps. In one example, a portion of the buffer 130 is arranged to contact the housing 110 and the gear box 240 separately, and the portion of the buffer 130 is arranged to have a gap with the housing 110 or the gear box 240. Therefore, if the reciprocating saw 100 has been used for a long time and a portion of the buffers 130 undergo plastic deformation, there would still be a portion of the buffer 130 that can effectively buffer the functional assembly 200.

Figure 6:
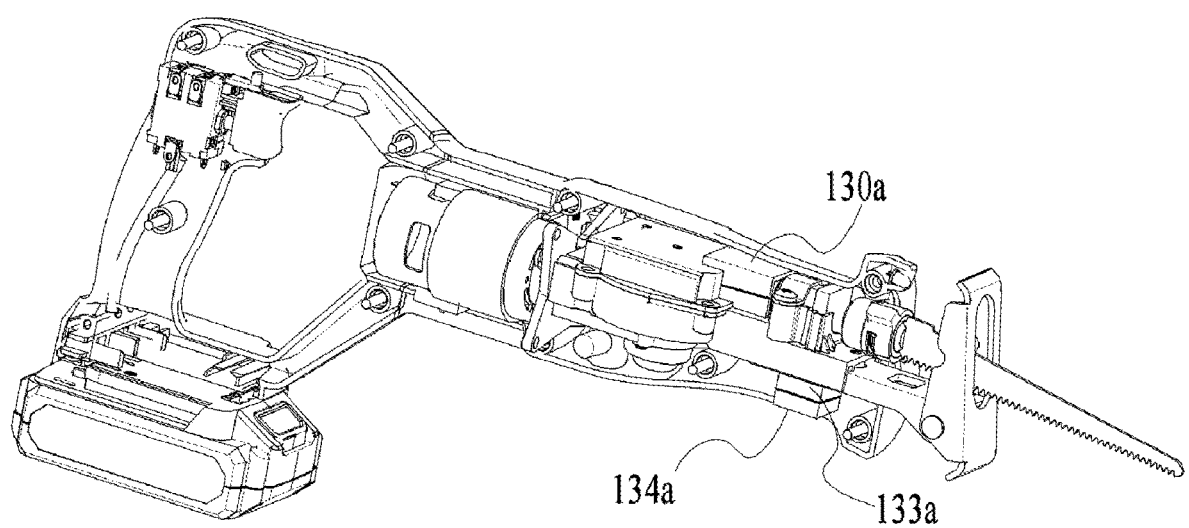
FIG. 6 is a schematic view of the inner structure of a reciprocating saw as the second example.

In one example, referring to FIG. 6, the buffer 130a includes a first buffer 133a and a second buffer 134a, and the hardness of the first buffer 133a is less than that of the second buffer 134a. The first buffer 133a and the second buffer 134a are configured to be overlapped in the direction of the second straight line, that is, the projections of the first buffer 133a and the second buffer 134a on the second straight line are at least partially overlapped.

Due to the characteristics of the buffer 130a, the lower the hardness of the buffer 130a, the better the buffering effect is. However, the buffer 130a of lower hardness is easier to be pressed to a limit deformation. That is, the buffer will lose the buffering ability once the amplitude of the reciprocating saw exceeds the limit deformation of the reciprocating saw. Therefore, the utilizing of a single low-hardness buffer 130a leads to a lower upper bound of vibration isolating range. The high-hardness buffers 130a have a higher upper bound of vibration isolating range, but the buffering effect are not that outstanding, which makes them suitable to be used for reciprocating saws with large amplitude or heavy load. In order to resolve the vibration isolating limitation limited by the buffers 130a of different characteristics, the first buffer 133a and the second buffer 134a are configured to be of different hardness. Preferably, the ratio of a hardness difference of the first buffer 133a and the second buffer 134a divided by the hardness of the first buffer 133a is between 0.3 and 0.8. Through the cooperation of the first buffer 133a and the second buffer 134a with different hardness, the vibrations for the reciprocating saw under both working conditions with larger or smaller amplitudes are all able to be buffered. In this way, the upper bound of vibration isolating range is improved, and the service life of the reciprocating saw is also extended. It can be understood that the hardness of the above buffers 130a refer to the Shore hardness standard, and can also be other hardness standards, which does not constitute a limitation here.

Figure 7:
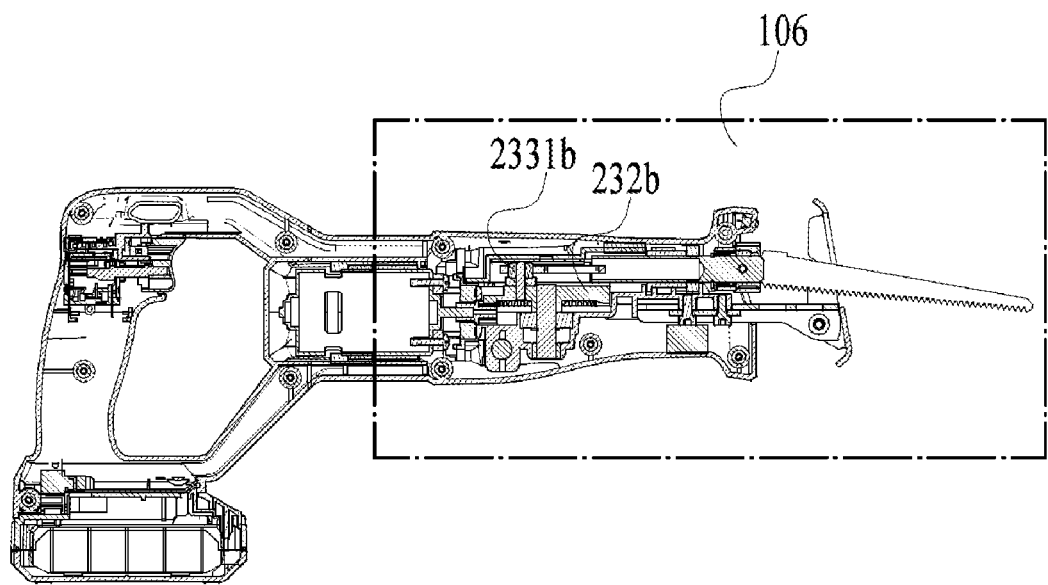
FIG. 7 is a schematic view of the inner structure of a reciprocating saw as the third example.

Optionally, referring to FIG. 7, a counterweight 232b is eccentrically arranged on the transmission gear 232b. The counterweight 232b is set with a certain weight and rotates synchronously with the transmission gear 232b. The transmission gear 232b can be driven by the motor to rotate about the second axis. One end of a transmission part 2331b is set to be placed into the guiding rail, and another end is connected with the transmission gear 232b. In the radial direction of the second axis, the counterweight 232b and the transmission gear 232b are arranged on the surface of the transmission gear 232b and away from the second axis. The counterweight 232 and the transmission gear 232b are arranged oppositely, so that when the transmission gear 232b rotates, the transmission gear 232b drives the sliding rod and the counterweight 232b to move in opposite directions through the transmission part 2331b, thereby reducing the vibration generated during the operation of the reciprocating saw.

Figure 8:
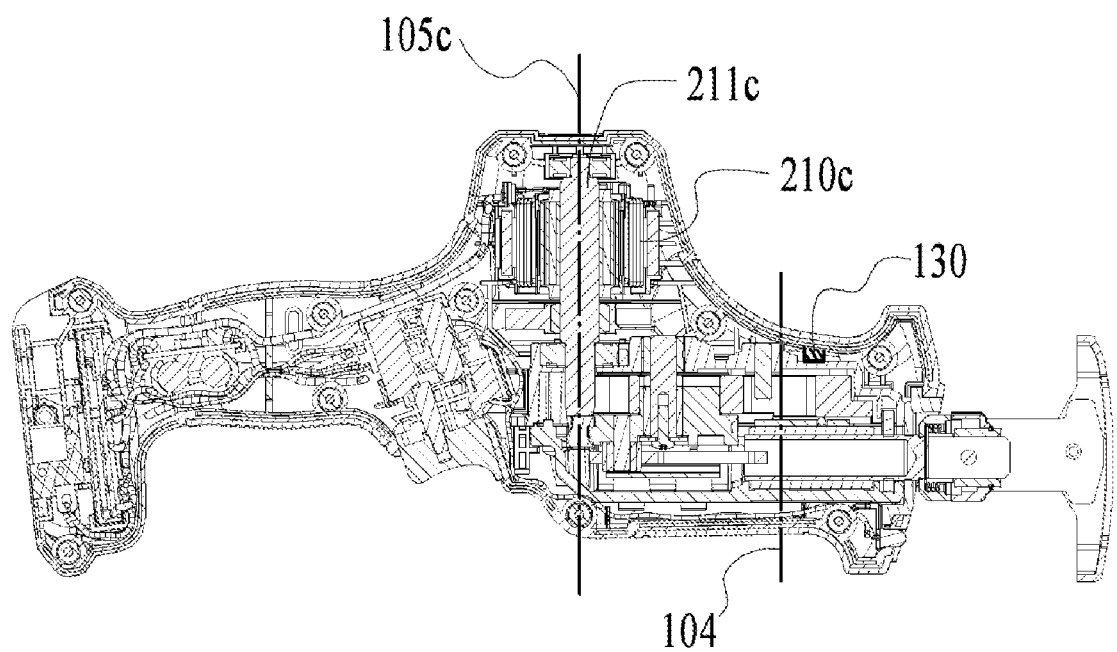
FIG. 8 is a section view of a reciprocating saw as the fourth example.

Optionally, referring to FIG. 8, a motor 210c includes a motor shaft 211c that rotates along a first axis 105c. The first axis 105 is perpendicular to the first straight line and the first direction, and parallel to the second straight line 104. On this condition, the reciprocating saw can be configured as a one-handed reciprocating saw. The working load of the one-handed reciprocating saw is relatively small and is convenient for the users to operate with only one hand. The disclosure improves the cutting efficiency of the one-handed reciprocating saw by achieving the orbital movement of the saw blade. All the examples proposed by the present disclosure can also be applied to the two-handed reciprocating saw, which does not pose a limitation here.

Figure 10:
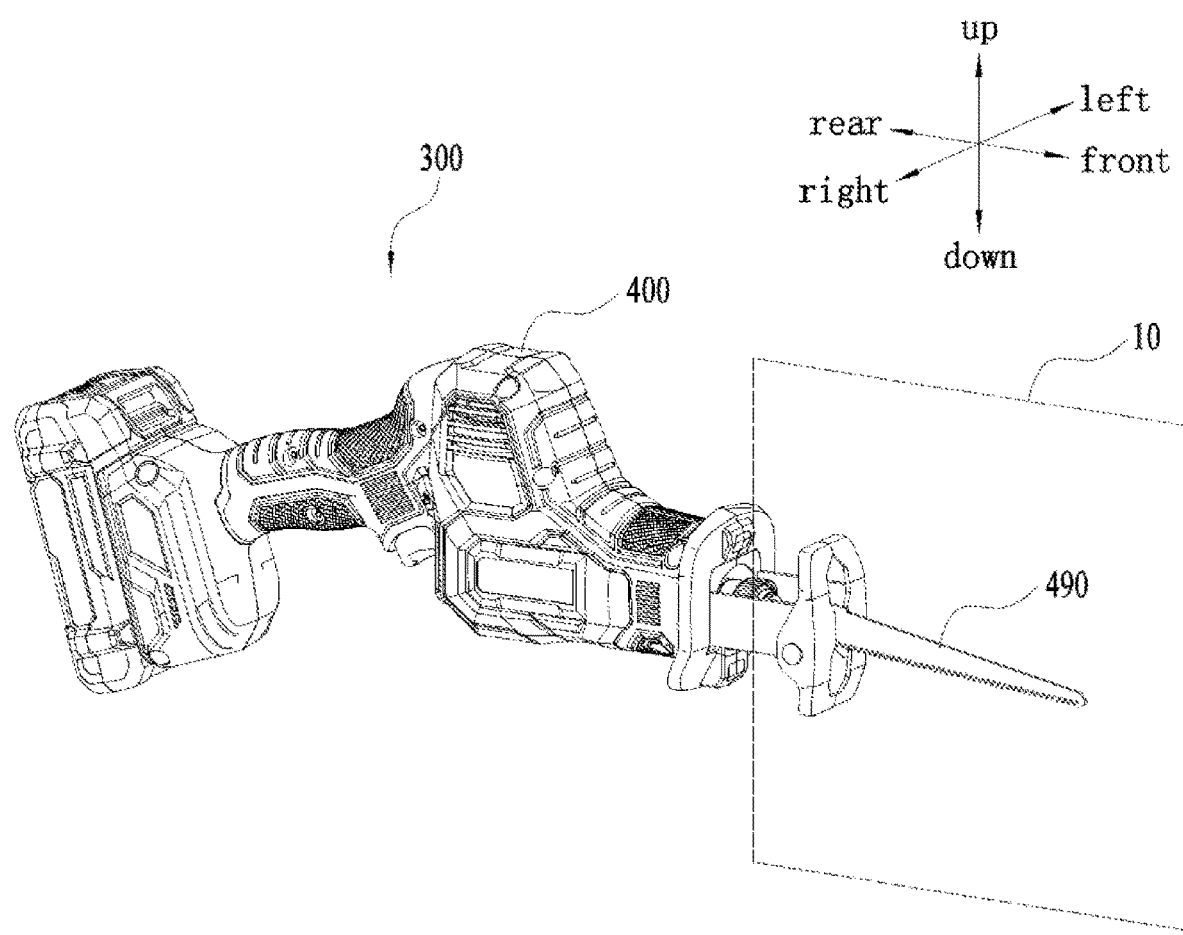
FIG. 10 is a perspective view of a reciprocating saw as the fifth example.
Figure 11:
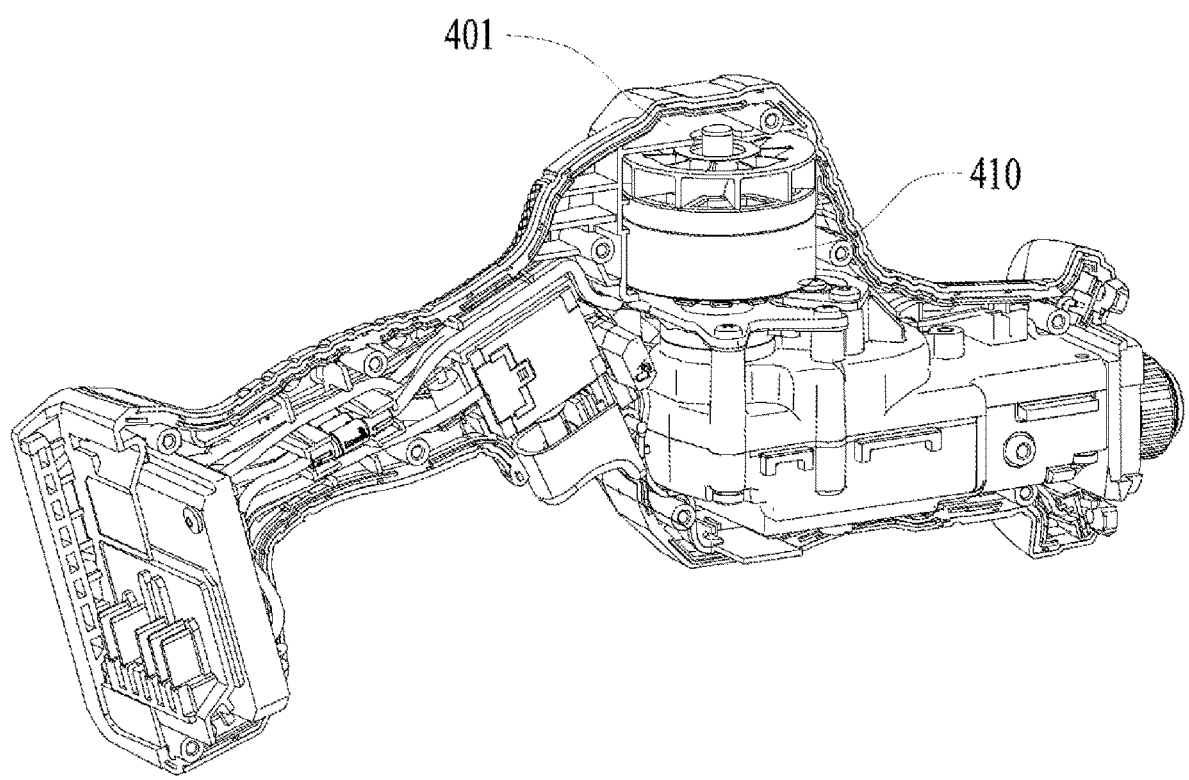
FIG. 11 is a perspective view of the reciprocating saw as the fifth example removing partial housing.

FIG. 10 defines six directions of up, down, left, right, front, and back. As shown in FIG. 10 and FIG. 11, the present disclosure provides a reciprocating saw 300 including a housing 400, a motor 410, a transmission assembly 430, a counterweight 440, a sliding rod 450, and a guiding mechanism 470. The housing 400 forms an accommodating space 401. When the motor 410 is on, the output power drives a saw blade 490 to reciprocate on a cutting plane 10.

Figure 12:
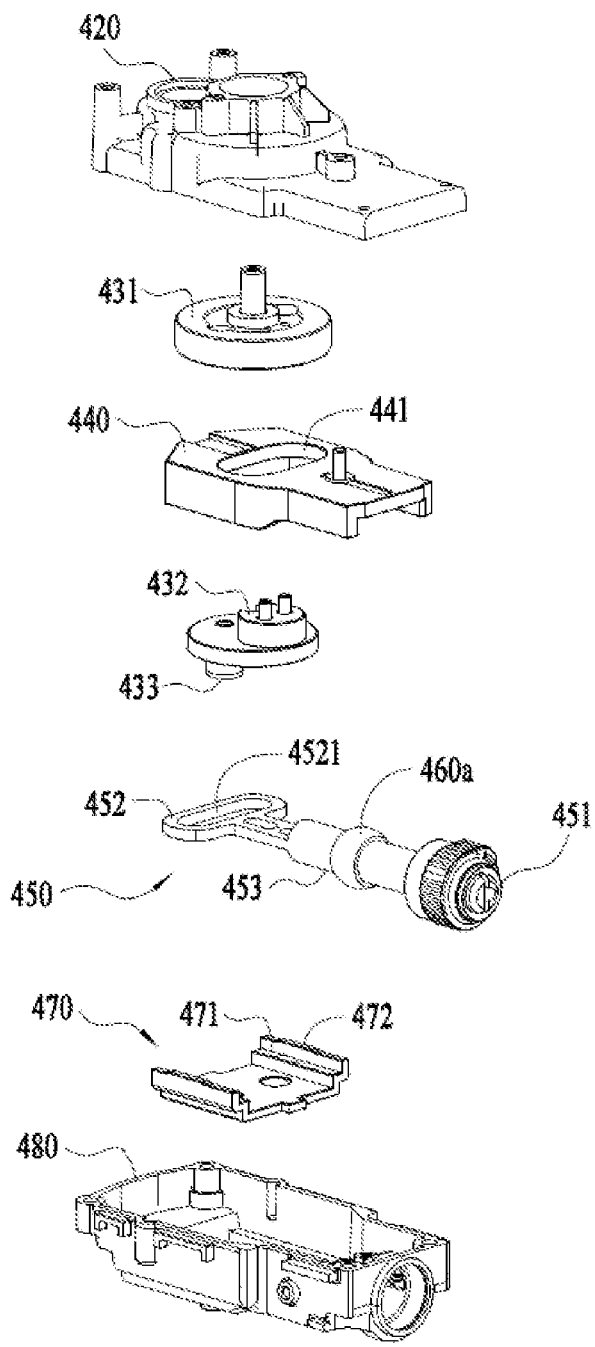
FIG. 12 is an exploded view of partial parts of the reciprocating saw of FIG. 11.
Figure 13:
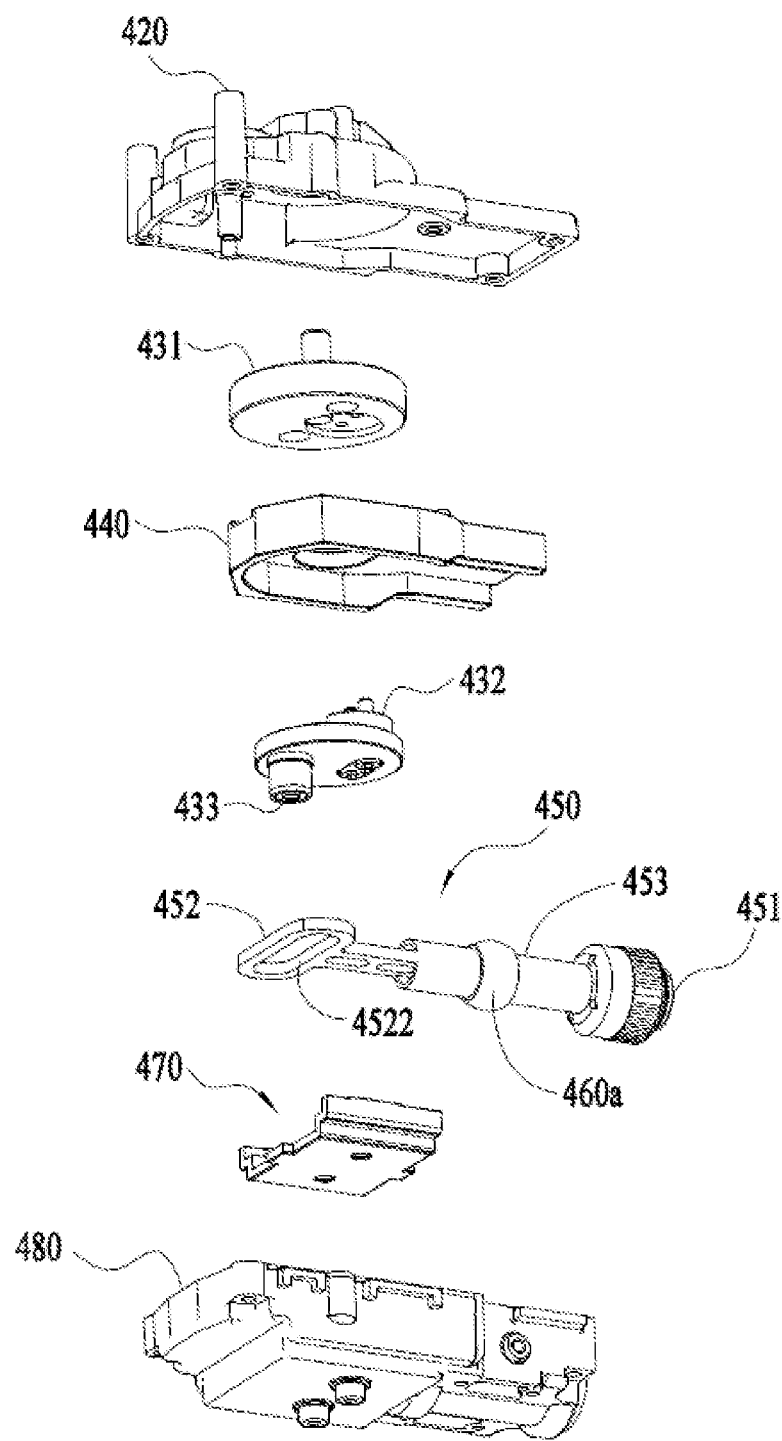
FIG. 13 is another perspective view for the parts of FIG. 12.
Figure 14:
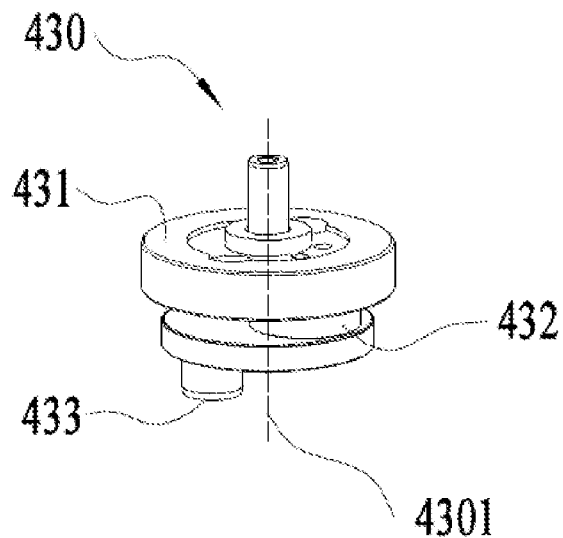
FIG. 14 is a perspective view of the transmission assembly.

FIGS. 12 and 13 are exploded views of partial structures of the reciprocating saw 300 of the first example in two views. In this example, when the motor 410 rotates, the motor output shaft drives a large gear 431 on the transmission assembly 430 to rotate, thereby driving the eccentric structure connected to the large gear 431 to rotate eccentrically. The transmission assembly 430 includes a first eccentric structure 432 and a second eccentric structure 433. The first eccentric structure 432 drives the counterweight 440 to reciprocate, and the second eccentric structure 433 drives the sliding rod 450 to reciprocate. The sliding rod 450 includes two ends of a first end 451 and a second end 452. The first end 451 is connected to the saw blade 490, and the second end 452 is connected to the second eccentric structure 433 of the transmission assembly 430. The second end 452 of the sliding rod 450 includes a first driving surface 4521 and a second driving surface 4522. When the second eccentric structure 433 rotates eccentrically, the driving force is applied to the first driving surface 4521 or the second driving surface 4522, thereby driving the entire sliding rod 450 and the saw blade 490 to reciprocate.

At the same time, the first eccentric structure 432 of the transmission assembly 430 is embedded in a first slot 441 of the counterweight 440. The first eccentric structure 432 and the second eccentric structure 433 are located in substantially opposite directions with respect to the central axis (a first axis 4301) of the large gear 431, so that the counterweight 440 driven by the first eccentric structure 432 and the second end 452 of the sliding rod 450 driven by the structure 433 always move in substantially opposite direction. Specifically, during the cutting stroke of the reciprocating saw 300, the saw blade 490 retracts backwards, and the counterweight 440 moves forward. In the return stroke of the reciprocating saw 300, that is, the orbital stroke of the saw blade 490, the saw blade 490 extends forward. The counterweight 440 moves in the backward direction. It should be noted that the "front" and "rear" here are only approximate azimuth directions, and do not refer to exact directions.

Figure 26:
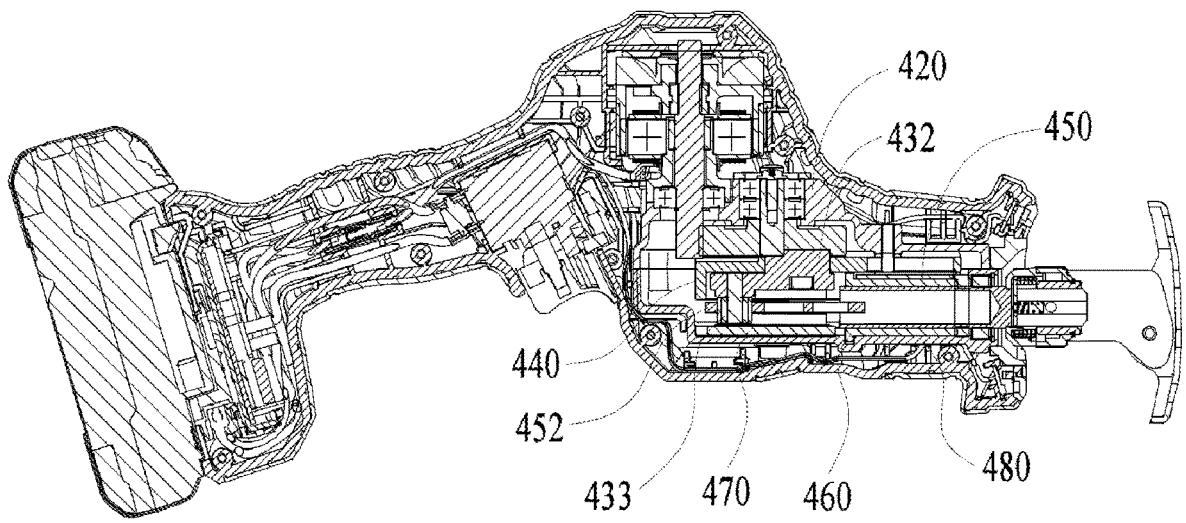
FIG. 26 is a section view of the reciprocating saw in FIG. 11.
Figure 27:
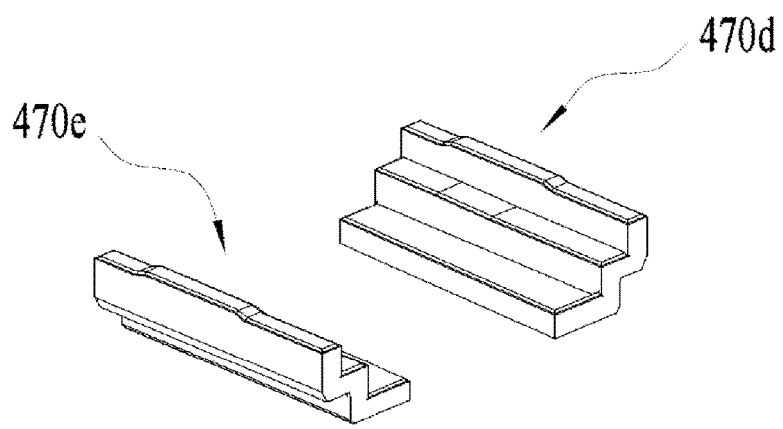
FIG. 27 is a perspective view of the guiding mechanism which includes a left guiding mechanism and a right guiding mechanism.

As shown in FIG. 26, the second end 452 of the sliding rod 450 is located between the counterweight 440 and the guiding mechanism 470. The counterweight 440 may be connected to the sliding rod 450 and the transmission assembly 430 through other kinds of structures, which is not limited to the eccentric structures.

Figure 15:
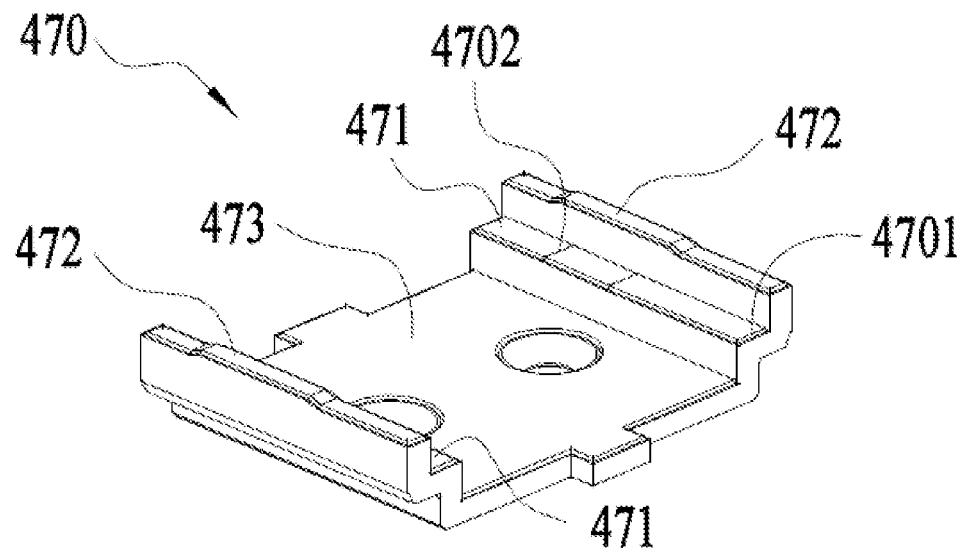
FIG. 15 is a perspective view for a guiding mechanism of FIG. 12

Now focusing on FIG. 15, the reciprocating saw of the present disclosure includes a guiding mechanism 470, the guiding mechanism 470 includes a first surface 471 and a second surface 472, wherein the second end 452 of the sliding rod 450 moves on the first surface 471 of the guiding mechanism 470. Also, the counterweight 440 and the second end 452 of the sliding rod 450 are located on the same side of the guiding mechanism 470.

Figure 18:
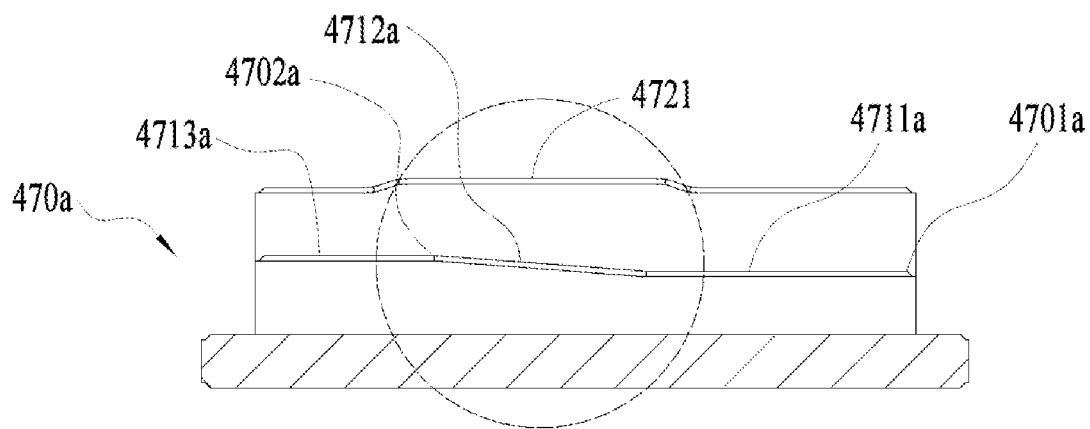
FIGS. 18 to 20 are section views of three examples of the guiding mechanism.
Figure 21:
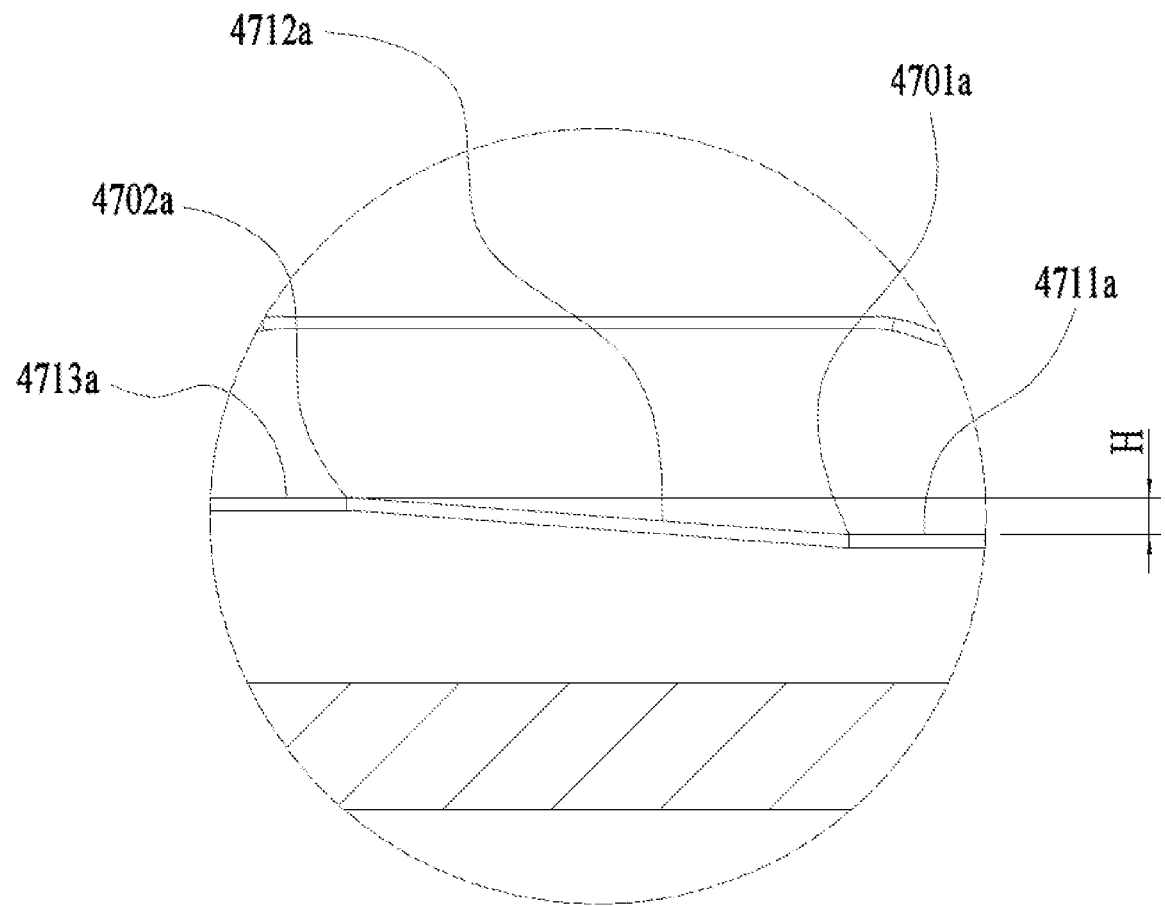
FIG. 21 is a magnified view of the guiding mechanism of FIG. 17.
Figure 22:
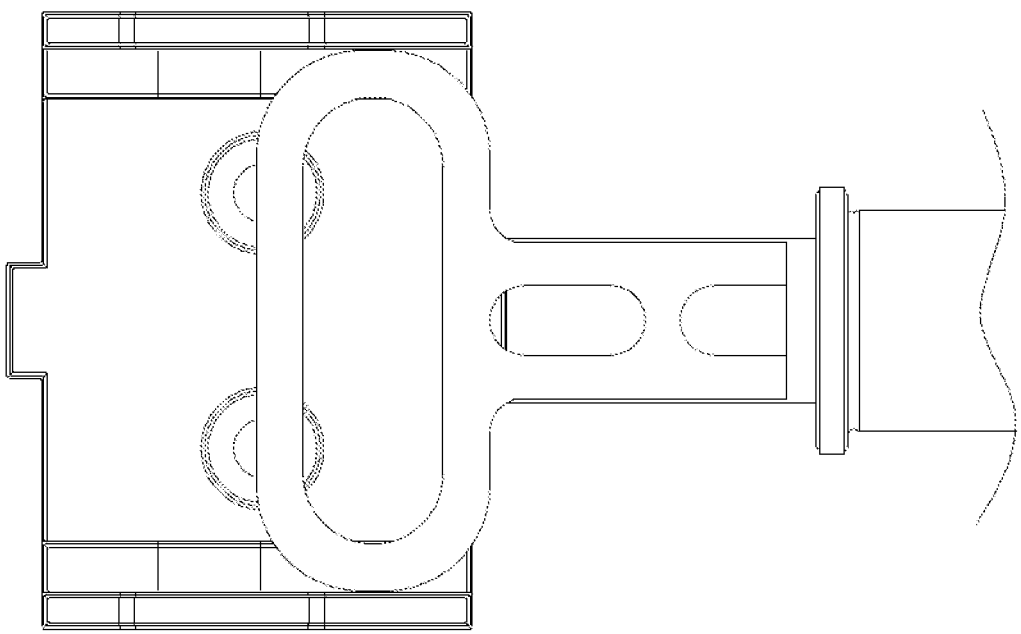
FIG. 22 is a top view when the sliding rod moves to a first position on the guiding mechanism.
Figure 23:
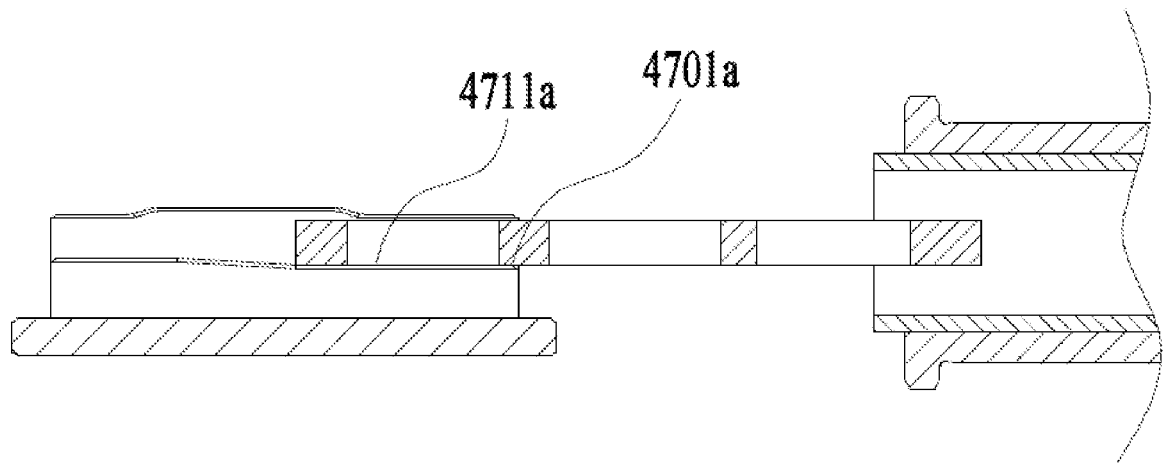
FIG. 23 is a section view of FIG. 22.
Figure 24:
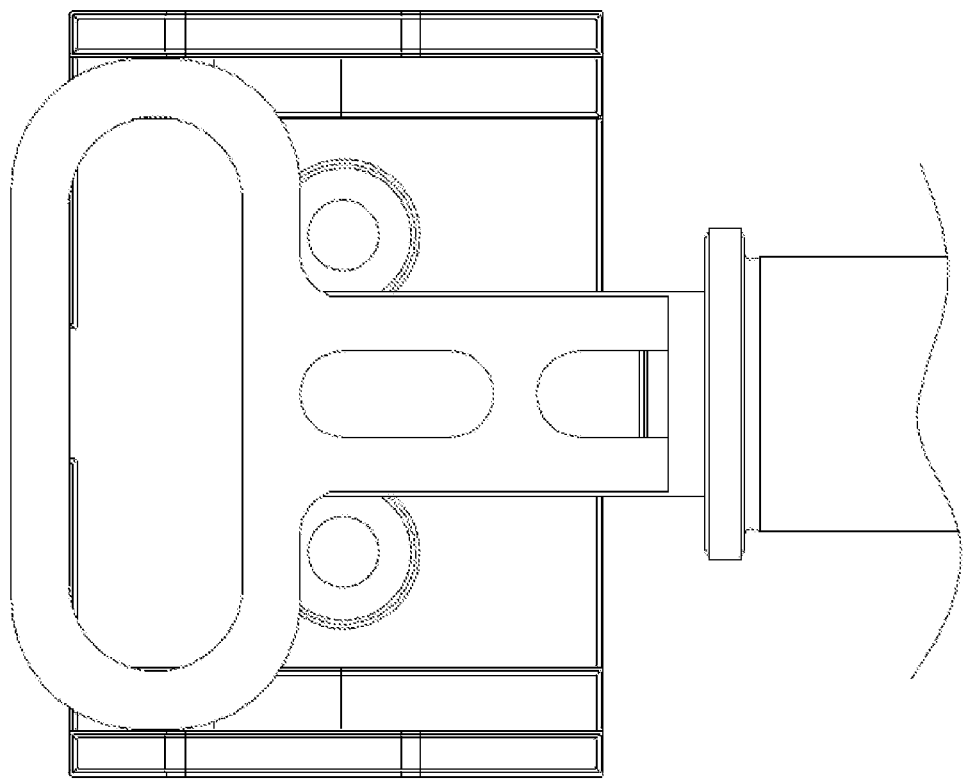
FIG. 24 is a top view when the sliding rod moves to a second position on the guiding mechanism.
Figure 25:
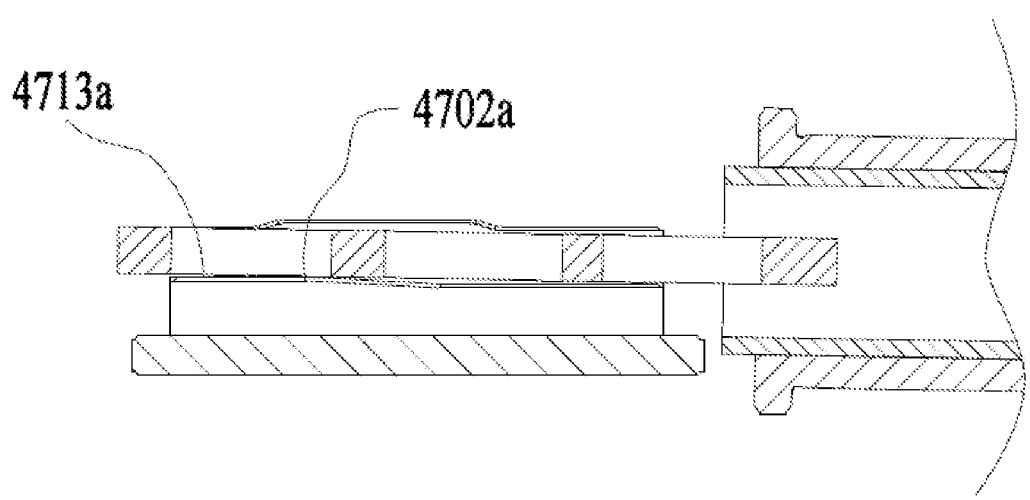
FIG. 25 is a section view of FIG. 24.

Taking the example disclosed in FIGS. 15, 18 and 21 as an example, the first surface 471 of the guiding mechanism 470 includes three surfaces: a first inclined surface 4711a, a second inclined surface 4712a, and a third inclined surface 4713a. The first inclined surface 4711a includes the lowest point 4701a, the second inclined surface 47112a includes the highest point 4702a, and the slope of the third inclined surface 4712a is the same as that of the first inclined surface 4711a.

In this example, the second end 452 of the sliding rod 450 is located between the counterweight 440 and the guiding mechanism 470. In addition, the sliding rod 450 further includes a supporting part 453, the supporting part 453 is supported by a sliding rod bearing 460, and the sliding rod bearing 460 enable the sliding rod 450 to swing around the sliding rod bearing 460. Optionally, the sliding rod bearing 460 is a ball bearing 460a, so that the sliding rod 460 can swing around the ball bearing 460a. When the second end 452 of the sliding rod 450 swings in the up and down direction around the sliding rod bearing, the counterweight 440 also limits the swing of the second end 452 of the sliding rod 450 in the up and down direction.

More specifically, see FIGS. 18 and 21 to 25, when the reciprocating saw 300 is in the cutting stroke, the saw blade 490 moves backward and cuts the workpiece. At this time, the second end 452 of the sliding rod 450 moves from a first inclined surface 4711a to a third inclined surface 4713a, and the second end 452 of the sliding rod 450 is raised from a lowest point 4701a to a highest point 4702a. While passing through the sliding rod bearing 460, the first end 451 of the sliding rod 450 drives the saw blade 490 to be pressed down. Similarly, when the reciprocating saw 300 is in the return stroke, the saw blade 490 extends forward, and the second end 452 of the sliding rod 450 moves from the third inclined surface 4713a to the first inclined surface 4711a, and the second end 452 of the sliding rod 450 is lowered from the highest point 4702a to the lowest point 4701a, so that the saw blade 490 is lifted upward. There is a gap between the lifted saw blade 490 and the workpiece to be cut, which is conducive to the discharge of debris. The saw teeth will not contact and rub with the material to be cut during the return stroke, thereby increasing the cutting efficiency and improving the life of the saw blade 490.

The second end 452 of the sliding rod 450 passes the first position and the second position when moves on the first surface 471 of the guiding mechanism 470, and the height difference between the first position and the second position is equal to or larger than 0.2 mm and equal to or smaller than 1 mm.

Figure 19:
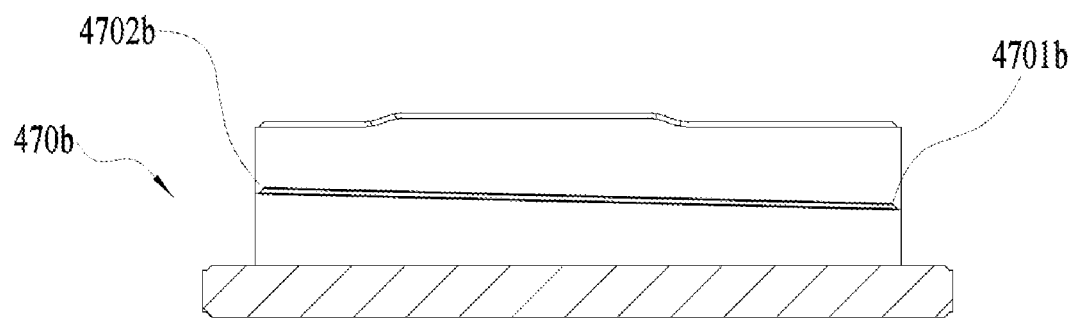
Figure 20:
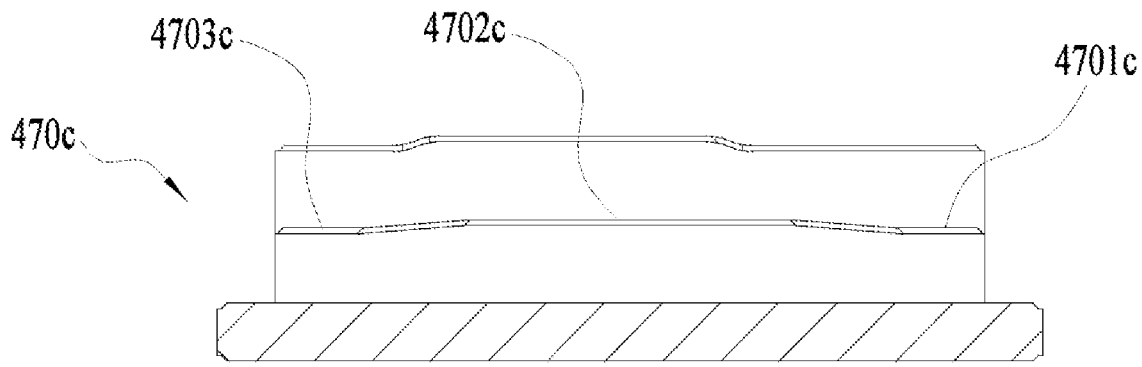

Optionally, FIG. 19 and FIG. 20 are examples of the other two guiding mechanism 470. Among them, 4701b and 4701c are lowest points 4701 in the two examples respectively, and 4702b and 4702c are highest points 4702 in the two examples respectively. The specific principle is the same as the above description and will not be repeated here. It should be pointed out that in FIG. 11, when the second end 452 of the sliding rod 450 moves on the first surface 471 of the guiding mechanism 470, the second end 452 moves to a third position 4703c while passing a second position 4702c, and the height of 4703c is higher than that of the 4702c. It is understandable that the first surface 471 of the guiding mechanism 470 may not be flat plane and may also be curved surface.

Optionally, the guiding mechanism 470 further includes a second surface 472. In this example, the second surface 472 of the guiding mechanism 470 supports the counterweight 440 to move (see FIG. 15, FIG. 16 and FIG. 19). In other examples, the supporting force can be not from the guiding mechanism 470. The counterweight 440 moves substantially in a direction opposite to the sliding rod 450, which helps to reduce the vibration of the tool and improve the users' experience. The counterweight 440 in the reciprocating saw 300 in the present disclosure moves on the second surface 472 of the guiding mechanism 470, which not only helps to absorb the vibration, but also save the space in the up and down direction, and further ensure the compactness of the tool. Optionally, the second surface 472 of the guiding mechanism 470 may include a platform 4721, which allows the gap between the counterweight 440 and the guiding mechanism 470, thereby improving the heat dissipation capacity of the components and prolonging the life of the workpiece.

Now returning to FIGS. 12 and 13, this example also includes an upper gear box housing 420 and a lower gear box housing 480. The lower gear box housing 480 is located between the sliding rod 450 and the housing 410, and the guiding mechanism 470 is fixed to the lower gear box housing 480. The sliding rod bearing 460 and the guide mechanism 470 are fixed on the lower gear box housing 480. In some examples, the sliding rod bearing 460 and the guiding mechanism 470 can also be directly fixed to the housing 400. In this example, the end of the second eccentric mechanism 433 falls on a bottom plate 473 of the guide mechanism 470 (see FIG. 15), and slightly rubs with the bottom plate 473 during operation. Optionally, the guiding mechanism 470 includes a left guiding mechanism 470d and a right guiding mechanism 470e (see FIG. 22). The second eccentric mechanism 433 may not directly contact the bottom plate 473 of the guide mechanism 470, which does not affect the eccentric function of the tool and the orbital moving path of the blade. In other words, the bottom plate 473 of the guide mechanism 470 is not necessarily composed, and can be changed according to the structure of the lower gear box housing 480 or the housing 400. If the guiding mechanism 470 is split into a left guiding mechanism 470d and a right guiding mechanism 470e without changing other characteristics, it also falls within the protection scope of this disclosure.

In addition, in this example, the bottom plate 473 of the guide mechanism 470 is fixed to the lower gear box housing 480 by screws. Optionally, the guiding mechanism 470 can also be adhered to the lower gear box housing 480 or the housing 400 through a liquid adhesive, and the fixing method does not constitute a limitation.

Figure 16:
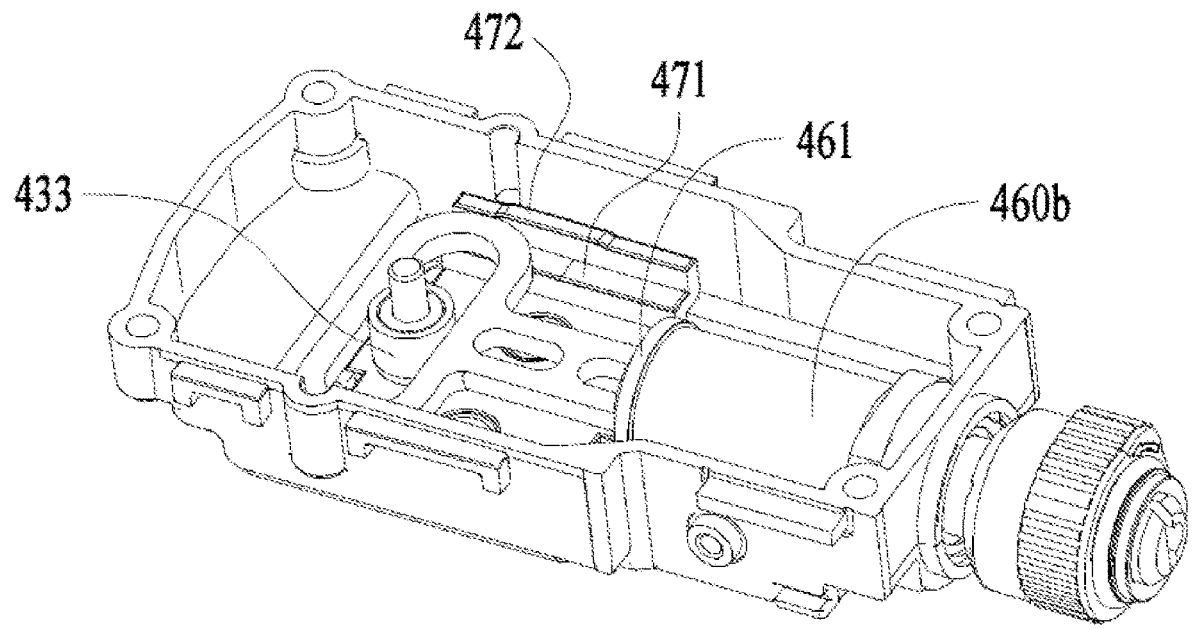
FIG. 16 is a perspective view when a sliding rod slides on the guiding mechanism which is fixed on a lower gear box housing.
Figure 17:
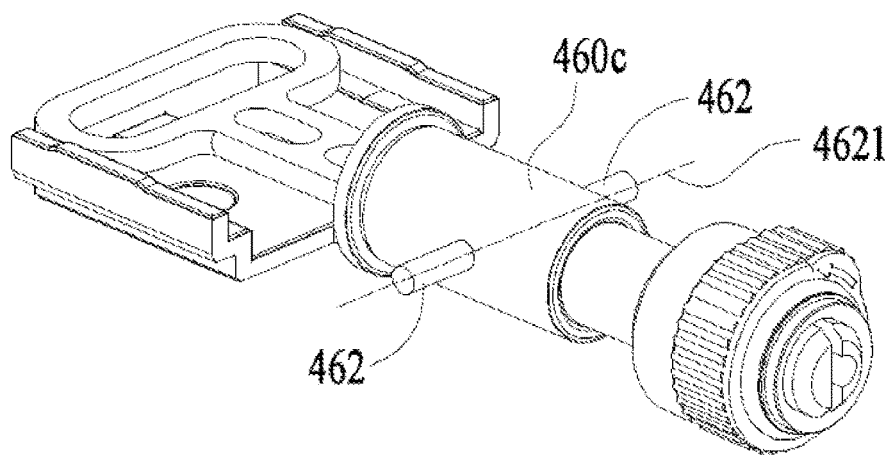
FIG. 17 is a perspective view when the sliding rod bearing includes pins.

In the example of FIG. 16, the sliding rod bearing 460 is an elastic bearing 460. An elastic end 461 of the elastic bearing 460b allows the sliding rod 450 to swing in the elastic bearing 460b. In the example of FIG. 17, the sliding rod bearing 460 includes pins 462, and the sliding rod 450 can swing around the pins 462. The sliding rod bearing 460 is now a rigid bearing 460c. The rigid bearing 460c has a pair of pins 462 perpendicular to the cutting plane 10, and the pins 462 allow the second end 452 of the sliding rod 450 to rotate a certain angle around the central axis (a second axis 4621) of the pins 462 while be lifted by the guiding mechanism 470. It should be noted that the sliding rod bearing 460 is not limited to the above structures and other structures or their combined structures can also be accepted.

It is understandable that the examples proposed by the present disclosure can also be applied to other types of power tools, such as multifunctional power tools.

The above information illustrates and describes the basic principles, main features and advantages of the present disclosure. Those skilled in the art will recognize that the foregoing examples will not limit the present disclosure on any aspects, and those technical solutions obtained by equivalent substitutions or equivalent transformations will fall within the protection scope of the present disclosure.

What is claimed is:
1. A reciprocating saw, comprising:
an outer housing;
a functional assembly accommodated within the outer housing, the functional assembly comprising:
a motor supported by the outer housing with the motor spaced from an inside surface of the outer housing;

a sliding rod operably coupled to the motor and configured to connect to and drive a saw blade extending from the outer housing; and a transmission mechanism connecting the motor and the sliding rod, the transmission configured to drive the sliding rod to reciprocate; and a connecting device rotatably coupling the functional assembly to the outer housing, such that the functional assembly is rotatable relative to the outer housing about the connecting device allowing for an orbital movement of the saw blade, a buffer coupled between the functional assembly and the outer housing, wherein the functional assembly is rotatable relative to the outer housing about a first straight line and the first straight line is perpendicular to a cutting plane of the reciprocating saw.

2. The reciprocating saw of claim 1, wherein the transmission mechanism comprises a transmission gear driven to rotate by the motor, a counterweight coupled to the transmission gear, and a first eccentric structure connecting the sliding rod and the transmission gear, the transmission gear drives the sliding rod to reciprocate along a first direction and a second direction through the first eccentric structure, and the counterweight moves in the second direction opposite to the first direction when the sliding rod moves in the first direction.

3. The reciprocating saw of claim 2, wherein the buffer comprises an elastically deformable material arranged at least in a second straight line which is perpendicular to the first straight line when the reciprocating saw is in operation.

4. The reciprocating saw of claim 2, wherein the functional assembly further comprises a gear box supporting the transmission mechanism and the buffer is positioned between the gear box and the outer housing.

5. The reciprocating saw of claim 4, wherein the connecting device comprises a fixed member and a rotating member, the rotating member is rotatably coupled with the fixed member, and the fixed member and the rotating member are fixedly coupled with the gear box and the outer housing respectively.

6. The reciprocating saw of claim 2, wherein the transmission mechanism further comprises a second eccentric structure coupled to the counterweight and the second eccentric structure drives the counterweight along in the second direction which is opposite to the first direction when the sliding rod moves in the first direction.

7. The reciprocating saw of claim 6, wherein the motor comprises a motor shaft rotating about a first axis, the first axis is perpendicular to the first straight line and the first direction, and an axial distance between the counterweight and the sliding rod along the first axis is greater than 10 mm.

8. The reciprocating saw of claim 1, wherein the buffer is one of or a combination of a sponge element, a rubber element, or a spring element and the buffer has a first buffer surface in contact with the outer housing and a second buffer surface in contact with the functional assembly.

9. The reciprocating saw of claim 2, wherein the sliding rod slides towards an inside of the outer housing and a front end of the sliding rod moves downward when the sliding rod moves in the second direction paralleled to the cutting plane.

10. A reciprocating saw, comprising:
an outer housing;
a functional assembly accommodated within the outer housing, the functional assembly comprising:
a motor supported by the outer housing;
a sliding rod operably coupled to the motor and configured to connect to and drive a saw blade extending from the outer housing; and
a transmission mechanism connecting the motor and the sliding rod, the transmission configured to drive the sliding rod to reciprocate; and
a connecting device rotatably coupling the functional assembly to the outer housing such that the functional assembly is rotatable relative to the outer housing, the connecting device comprising a fixed member fixedly coupled to the functional assembly, and a rotating member fixedly coupled to the outer housing, and
wherein the fixed member of the functional assembly is rotatable relative to the rotating member of the outer housing such that the functional assembly is rotatable relative to the outer housing about a first straight line causing an orbital movement of the saw blade.

11. The reciprocating saw of claim 10, wherein the reciprocating saw comprises a cutting plane, and the first straight line is perpendicular to the cutting plane.

12. The reciprocating saw of claim 11, wherein the transmission mechanism comprises a transmission gear driven to rotate by the motor, a counterweight coupled to the transmission gear, and a first eccentric structure connecting the sliding rod and the transmission gear, the transmission gear drives the sliding rod to reciprocate along a first direction and a second direction through the first eccentric structure, and the counterweight moves in the second direction opposite to the first direction when the sliding rod moves in the first direction.

13. The reciprocating saw of claim 12, further comprising a buffer positioned between the functional assembly and the outer housing, wherein the buffer is elastically deformed at least in a second straight line which is perpendicular to the first straight line when the reciprocating saw is in operation.

14. The reciprocating saw of claim 12, wherein the functional assembly further comprises a gear box supporting the transmission mechanism, the connecting device comprises a fixed member and a rotating member, the rotating member is rotatably coupled with the fixed member, and the fixed member and the rotating member are fixedly coupled with the gear box and the outer housing respectively.

15. The reciprocating saw of claim 12, wherein the transmission mechanism further comprises a second eccentric structure coupled to the counterweight and the second eccentric structure drives the counterweight along in the second direction which is opposite to the first direction when the sliding rod moves in the first direction.

16. The reciprocating saw of claim 15, wherein the motor comprises a motor shaft rotating about a first axis and the first axis is perpendicular to the first straight line and the first direction and an axial distance between the counterweight and the sliding rod along the first axis is greater than 10 mm.

17. The reciprocating saw of claim 12, wherein the sliding rod slides towards an inside of the outer housing and a front end of the sliding rod moves downward when the sliding rod moves in the second direction paralleled to the cutting plane.

* * * * *